(12) United States Patent
Ueda et al.

(10) Patent No.: US 6,936,567 B2
(45) Date of Patent: Aug. 30, 2005

(54) FUEL REFORMER AND MANUFACTURING METHOD OF THE SAME

(75) Inventors: Masatoshi Ueda, Osaka (JP); Masataka Kadowaki, Osaka (JP); Akira Fuju, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 122 days.

(21) Appl. No.: 10/069,912

(22) PCT Filed: Jun. 27, 2001

(86) PCT No.: PCT/JP01/05528

§ 371 (c)(1),
(2), (4) Date: Feb. 27, 2002

(87) PCT Pub. No.: WO02/00546

PCT Pub. Date: Jan. 3, 2002

(65) Prior Publication Data

US 2002/0121461 A1 Sep. 5, 2002

(30) Foreign Application Priority Data

Jun. 28, 2000 (JP) ........................ 2000-194265

(51) Int. Cl.[7] .............................. B01J 23/00
(52) U.S. Cl. .................. 502/316; 502/313; 502/319
(58) Field of Search ................. 502/313, 316, 502/319; 423/652, 653, 654

(56) References Cited

U.S. PATENT DOCUMENTS

| | | | |
|---|---|---|---|
| 3,920,583 A | * 11/1975 | Pugh | 502/314 |
| 3,923,696 A | * 12/1975 | Chart et al. | 502/307 |
| 4,515,905 A | * 5/1985 | Uytterhoeven et al. | 502/309 |
| 4,673,663 A | * 6/1987 | Magnier | 502/320 |
| 4,690,690 A | * 9/1987 | Andrew et al. | 48/214 A |
| 4,752,599 A | * 6/1988 | Nakamura et al. | 502/257 |
| 5,362,454 A | * 11/1994 | Cizmer et al. | 422/201 |
| 5,851,948 A | * 12/1998 | Chuang et al. | 502/314 |
| 6,139,810 A | * 10/2000 | Gottzmann et al. | 422/197 |
| 6,254,839 B1 | * 7/2001 | Clawson et al. | 422/190 |
| 6,468,480 B1 | * 10/2002 | Clawson et al. | 422/211 |

FOREIGN PATENT DOCUMENTS

| | | |
|---|---|---|
| GB | 2 066 696 A | 7/1981 |
| JP | 56-84789 | 7/1981 |
| JP | 57-43989 | 3/1982 |
| JP | 59-140392 | 8/1984 |
| JP | 6-13096 | 1/1994 |
| JP | 6-56401 | 3/1994 |
| JP | 7-109105 | 4/1995 |
| JP | 7-223801 | 8/1995 |
| JP | 7-335238 | 12/1995 |
| JP | 9-241002 | 9/1997 |
| JP | 9-508651 | 9/1997 |
| JP | 2703831 | 10/1997 |
| JP | 9-306553 | 11/1997 |
| JP | 10-125342 | 5/1998 |
| JP | 2000-169103 | 6/2000 |
| WO | WO 92/15653 | 9/1992 |
| WO | WO 95/18849 | 7/1995 |

* cited by examiner

*Primary Examiner*—Cam N. Nguyen
(74) *Attorney, Agent, or Firm*—Weingarten, Schurgin, Gagnebin & Lebovici LLP

(57) ABSTRACT

The present invention concerns a fuel reformer for reforming a hydrocarbon base fuel in to a hydrogen rich gas and a manufacturing method thereof, and the fuel reformer of the present invention wherein a Cr oxide layer is formed on at least a part of the surface of steel material making the reformer produces no red scale through water vapor oxidation of the surface of steel material making the reformer, even when exposed to an atmosphere of low oxygen concentration and/or high water vapor concentration under a high temperature and has an extremely important industrial utility value because it is highly heat resistant, light, low cost and cheap, highly reliable and long life, and moreover a cheap, highly reliable and long life fuel reformer can be manufactured at a low cost and easily by the manufacturing method of the present invention.

11 Claims, 3 Drawing Sheets

FUEL REFORMER AND MANUFACTURING METHOD OF THE SAME

FIELD OF THE INVENTION

The present invention concerns a fuel reformer and a manufacturing method thereof, and more particularly, a fuel reformer for reforming a hydrocarbon base fuel into a hydrogen rich gas and a manufacturing method thereof.

BACKGROUND ART

In case of supplying a reformer with a hydrocarbon base fuel, for example a mixture gas of methane and water vapor [for example, steam/carbon (mole ratio)=about 2.5] and reforming the same into a hydrogen rich gas (endothermic reaction) through water vapor reforming, the operating temperature of the reformer is approximately 700° C. (exit temperature of reforming catalyst layer); but, the surface temperature of the material making the reformer is supposed to be equal or superior to about 1000° C. in the vicinity of the heating portion of the reformer.

There has been a problem that the surface of steel material making the reformer, exposed to an atmosphere of low oxygen concentration and/or high water vapor concentration under a high temperature, is oxidized by water vapor, a rough, porous and fragile iron oxide layer (supposed to contain $Fe_2O_3$ mainly) (referred to as red scale, hereinafter) is formed on the surface thereof, the red scale tends to progress on and on into the substrate, having a nature of peeling off easily from the substrate, and the more the red scale peels off from the substrate, the more the corrosion of steel material advances. Though the destruction of the material by corrosion may be mitigated by increasing the thickness of the steel material, the weight increases, the processing becomes difficult and the cost increases.

The conventional fuel reformer has been used a heat resistant alloy USUS310S or the like) or super alloy (Incoloy800 or the like) of Cr:20 mass %, Ni:18 mass % or more. However, even in a reformer made of super alloy, for instance, red scale appeared on the surface of the combustion gas passage side including the heating portion.

A fuel reformer material containing C 0.1 wt % or less, Ni 8 to 29 wt %, Nb 0.1 to 0.4 wt %, containing one or two elements chosen from Ti, Zr by 0.05 to 0.3 wt %, and further containing N 0.02 to 0.05 wt %, B 0.003 to 0.01 wt % and composed of remaining Fe and inevitable impurities (Japan Patent Publication Laid-Open HEI 5-339679); however, a problem of the generation of red scale was not considered.

The object of the present invention is to provide a light, low cost and cheap, highly reliable and long life fuel reformer, that resolves conventional problems, and produces no red scale through water vapor oxidation of the surface of steel material making the reformer, even when exposed to an atmosphere of low oxygen concentration and/or high water vapor concentration under a high temperature.

DISCLOSURE OF THE INVENTION

In order to solve the aforementioned problems, the fuel reformer according to claim 1 is a fuel reformer for reforming a hydrocarbon base fuel into a hydrogen rich gas, wherein Cr oxide layer is formed on at least a part of the surface of steel material making the reformer.

The fuel reformer of claim 2 is characterized by that, in the fuel reformer of claim 1, the Cr oxide layer is formed on a surface of a fuel combustion gas passage side.

The fuel reformer of claim 3 is characterized by that, in the fuel reformer of claim 1, the Cr oxide layer is formed on a surface of a mixture gas passage from a fuel supply portion for supplying the reformer with mixture gas of raw fuel for reforming and water vapor to a reform catalyst filled portion.

The fuel reformer of claim 4 is characterized by that, in the fuel reformer of claim 1, wherein the Cr oxide layer is formed on a surface of the fuel combustion gas passage side and also on the surface of the mixture gas passage from a fuel supply portion for supplying the reformer with mixture gas of raw fuel for reforming and water vapor to the reforming catalyst filled portion.

The fuel reformer of claim 5 is characterized by that, in the fuel reformer of any of claims 1 to 4, the average thickness of the Cr oxide layer is 5 to 100 $\mu$m.

The fuel reformer of claim 6 is characterized by that, in the fuel reformer of any of claims 1 to 5, a thin film having a Cr concentration higher than a Cr concentration of a base material is formed on a surface of steel material making the reformer, and thereafter a Cr oxide layer formed by heat treatment is formed thereon.

The claim 7 is a manufacturing method of a fuel reformer comprising the steps of; forming a Cr oxide layer on a surface of raw steel material through a heat treatment of raw steel material in an oxidizing atmosphere of 600 to 1000° C., and manufacturing the reformer using raw steel material where the Cr oxide layer is formed thereon.

The claim 8 is a manufacturing method of a fuel reformer comprising a step of forming a Cr oxide layer on a surface of raw steel material, through a heat treatment of the fuel reformer made of raw steel material in an oxidizing atmosphere of 600 to 1000° C.

The claim 9 is a manufacturing method of a fuel reformer comprising the steps of; forming a thin film having a Cr concentration higher than a Cr concentration of a base material on a surface of raw steel material, and thereafter forming a Cr oxide layer on the surface of raw steel material, through a heat treatment in an oxidizing atmosphere of 350 to 650° C., and manufacturing the reformer using raw steel material on which the Cr oxide layer is formed thereon.

The claim 10 is a manufacturing method of a fuel reformer comprising the steps of; forming a thin film having a Cr concentration higher than a Cr concentration of a base material on a surface of raw steel material, and thereafter forming a Cr oxide layer on the surface of raw steel material, through a heat treatment of a fuel reformer made of raw steel material in an oxidizing atmosphere of 350 to 650° C.

DETAILED DESCRIPTION OF THE PREFERRED EMBODIMENT

Figure 1:
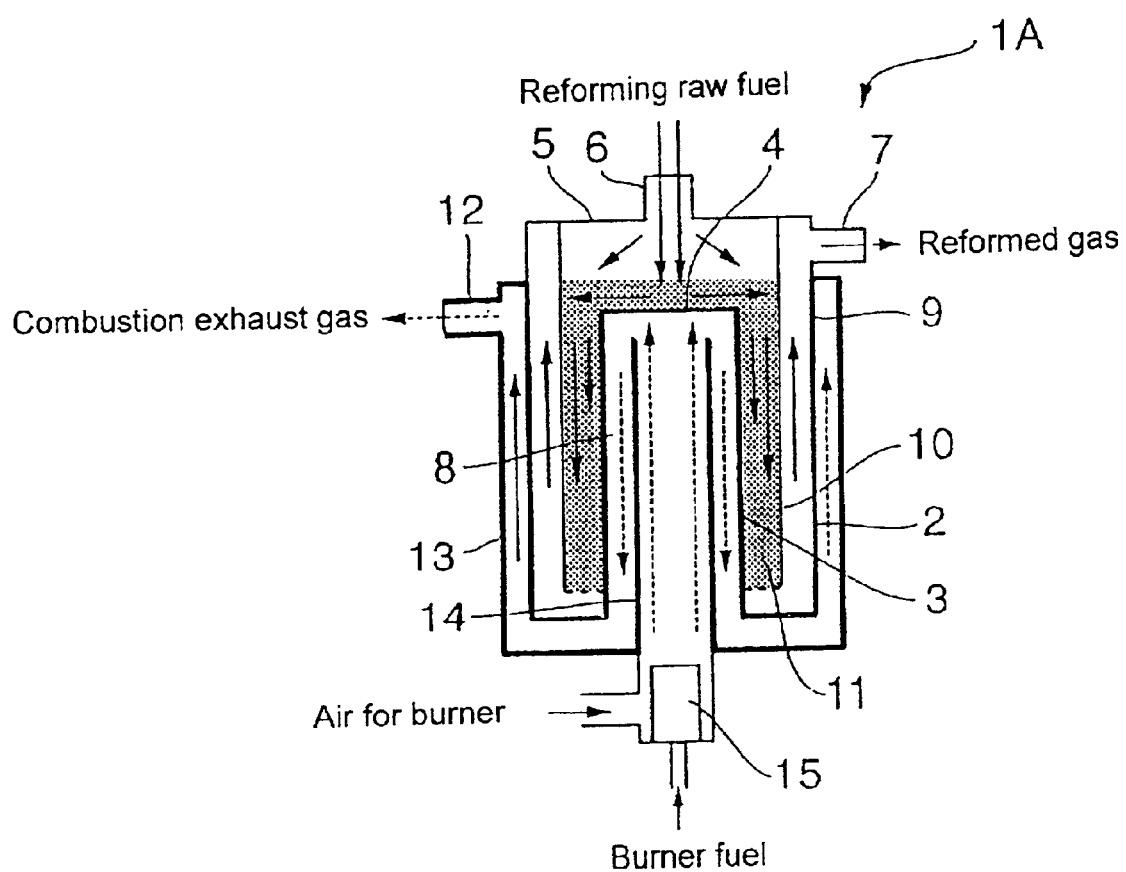
FIG. 1 a cross-portional illustrative drawing of an embodiment of the fuel reformer of the present invention.

According to a fuel reformer of claim 1 of the present invention, a Cr oxide layer is formed on at least a part of the surface of steel material making the fuel reformer. The Cr oxide layer is specifically a spinel oxide layer of Cr mainly $FeO \cdot Cr_2O_3$ or $Cr_2O_3$, dense and excellent in close adhesion with the substrate steel material, having few lattice defect, reducing remarkably diffusion of metal ion and oxygen ion, and being able to prevent water vapor oxidation. Consequently, the production of red scale is suppressed, the heat resistance is improved, whereby the life and reliability of the fuel reformer are improved.

Preferably, the average thickness of the Cr oxide layer is in a range of 5 to 100 •. A Cr oxide layer having an average thickness of 5 to 100 • is good in adherence to the substrate steel material, dense, and excellent in water vapor oxidation resistance. If it is less than 5 •, points where Cr oxide layer is partially absent appear, a uniform and dense Cr oxide layer might not be formed, while if it exceed 100 •, it takes long time to form the Cr oxide layer and becomes uneconomic.

According to the fuel reformer of claim 6, a thin film (thin film of chromium alloy, thin film of chromium, or the like. Average thickness on the order of about 1 to 100 •) having a Cr concentration higher than a Cr concentration of a base material is formed preliminarily on the surface of steel material making the reformer by chromizing, chromium plating or other methods, and thereafter a Cr oxide layer is formed by heat treatment. By so doing, it becomes less troublesome because the heat treatment temperature can be reduced, energy quantity can be lowered allowing to reduce energy consumption. Moreover, the Cr oxide layer formed by heat treatment becomes dense. In addition, as a thin film having a Cr concentration higher than a Cr concentration of a base material is formed preliminarily on the surface of steel material making the reformer, a dense Cr oxide layer can be formed in a short period of time on the surface, even when the base material Cr concentration is low.

According to the fuel reformer of claim 7, a Cr oxide layer is formed on the surface of raw steel material, through a heat treatment of raw steel material in an oxidizing atmosphere of 600 to 1000° C., and the fuel reformer is manufactured using raw steel material where the Cr oxide layer is formed thereon.

A spinel oxide layer of Cr containing mainly $FeO.Cr_2O_3$ or $Cr_2O_3$ can be formed on the surface of raw steel material, through a heat treatment of raw steel material in the oxidizing atmosphere of 600 to 1000° C., preferably for 30 min to 10 hours as mentioned above.

Consequently, the fuel reformer can be manufactured by forming the Cr oxide layer on the surface of raw steel material and thereafter, assembling or welding such steel material.

It should be appreciated that if the heat treatment temperature of raw steel material is less than 600° C., the Cr oxide layer might not be formed, while if it exceeds 1000° C., an expensive heater will be required, increasing the energy quantity to be input into the heater, and making the treatment uneconomic; so it is preferably in a temperature range of 600 to 1000° C. Moreover, if the heat treatment time is less than 30 min, an uniform and dense Cr oxide layer might not be formed, while if it exceeds 10 hours, the energy quantity to be input increases, making the treatment uneconomic. Therefore, the heat treatment time is preferably in a time range of 30 min to 10 hours.

Beside, according to the fuel reformer of claim 8, a Cr oxide layer is formed on the surface of raw steel material, through a heat treatment of a fuel reformer itself made of raw steel material in an oxidizing atmosphere of 600 to 1000° C. Thus, a spinel oxide layer of Cr containing mainly $FeO.Cr_2O_3$ or $Cr_2O_3$ can be formed on the surface of raw steel material, through a heat treatment of the fuel reformer itself, in the oxidizing atmosphere of 600 to 1000° C., preferably for 30 mins to 10 hours.

Consequently, a fuel reformer having a long life and an improved reliability can also be manufactured by the invention according to the present claim.

According to the fuel reformer of claim 9, a Cr oxide layer is formed on the surface of raw steel material by chromizing or chrome plating or the other methods, through a heat treatment in an oxidizing atmosphere of 350 to 650° C., after forming a thin film (thin film of chromium alloy, thin film of chromium, or the like. Average thickness on the order of about 1 to 100 •) having a Cr concentration higher than a Cr concentration of a base material on the surface of raw steel material and, the fuel reformer is made of raw steel material on which the surface the Cr oxide layer is formed. It becomes less troublesome because the heat treatment is performed in the oxidizing atmosphere of 350 to 650° C., energy quantity can be lowered allowing to reduce energy consumption. Moreover, the Cr oxide layer formed by heat treatment becomes dense. In addition, since a thin film having a Cr concentration higher than a Cr concentration of a base material is formed preliminarily on the surface of steel material making the reformer, a dense Cr oxide layer can be formed in a short period of time on the surface thereof, even when the base material Cr concentration is low.

A fuel reformer can be manufactured by forming a thin film having a Cr concentration higher than a Cr concentration of a base material on the surface of raw steel material, and thereafter forming a Cr oxide layer, through a heat treatment in an oxidizing atmosphere of 350 to 650° C., and assembling or welding such steel material. The heat treatment temperature is 350 to 650° C., and if it is less than 350° C., the Cr oxide layer might not be formed, while if it exceeds 600° C., the energy quantity also increases, making it uneconomic in respect to the effect.

According to the fuel reformer of claim 10, a thin film (thin film of chromium alloy, thin film of chromium, or the like. Average thickness on the order of about 1 to 100 •) having a Cr concentration higher than a Cr concentration of a base material is formed on the surface of raw steel material, and thereafter a Cr oxide layer is formed on raw steel material, through a heat treatment of a fuel reformer made of raw steel material in an oxidizing atmosphere of 350 to 650° C. It becomes less troublesome because the heat treatment is performed in the oxidizing atmosphere of 350 to 650° C., energy quantity can be lowered allowing to reduce energy consumption, and moreover, the Cr oxide layer formed by heat treatment becomes dense. In addition, since the thin film having a Cr concentration higher than a Cr concentration of a base material is formed preliminarily on the surface of steel material making the reformer, a dense Cr oxide layer can be formed in a short period of time on the surface thereof, even when the base material Cr concentration is low. The treatment temperature is 350 to 650° C., and if it is less than 350° C., the Cr oxide layer might not be formed, while if it exceeds 600° C., the energy quantity also increases, making it uneconomic in respect to the effect.

Consequently, a fuel reformer having a long life and an improved reliability can also be manufactured by the invention according to the present claim.

Now embodiments of the present invention will be described referring to the drawings.

FIG. 1 is a cross-portional illustrative drawing of an embodiment of a fuel reformer of the present invention.

In FIG. 1, a fuel reformer 1A of the present invention comprises a reforming tube outer cylinder 2, a reforming tube inner cylinder 3, a reforming tube inner cylinder upper plate 4, a reforming tube inner cylinder lower plate 5, a raw fuel inlet 6 provided on the reforming tube inner cylinder lower plate 5, a reformed gas outlet 7 or others, and also comprises a reforming tube 9 provided with a heating portion 8 for introducing a fuel gas for heating into a hollow portion installed at the middle thereof, a catalyst tube 10 fitted to the inside of the reforming tube 9, a reforming catalyst 11 (for instance, Ni, ruthenium catalyst supported by aluminum, or the like) filled between the reforming tube inner cylinder 3 and the catalyst tube 10 and also arranged on the reforming tube inner cylinder upper plate 4, a combustion exhaust gas pipe 13 for directing the combustion exhaust gas by bringing into contact with the outside of the reforming tube 9, and thereafter discharging outside from a combustion exhaust gas outlet 12, a combustion gas pipe 14 extending and inserted in order to introduce combustion gas into the heating portion 8, a burner 15 installed below the combustion gas pipe 14 for burning combustion gas, and others.

In FIG. 1, gas fuel is burned by introducing gas fuel and air into the burner 15, and combustion gas is directed to the heating portion 8 through the combustion gas pipe 14 as shown by the broken line arrow for heating the reforming catalyst 11, then, combustion exhaust gas is discharged from the combustion exhaust gas outlet 12 passing between the reforming tube outer cylinder 2 and the combustion exhaust gas pipe 13. On the other hand, a hydrocarbon base fuel, for instance, methane is introduced with water vapor from the raw material inlet 6 into the fuel reformer 1A as shown by arrow, brought into contact with the heated reforming catalyst 11, and reformed. The operating temperature of the fuel reformer 1A is controlled to about 700° C. (outlet temperature of the reforming catalyst 11) and operated. The produced reformed gas (if a raw material of steam/carbon (mole ratio)=about 2.5, a reformed gas containing hydrogen by about 75%, carbon monoxide by about 10 and several %, carbon dioxide by the order of 10 and several %, and methane gas for the remainder) is discharged from the reformed gas outlet 7 passing between the reforming tube outer cylinder 2 and the catalyst tube 10 as shown by the arrow.

In FIG. 1, a Cr oxide layer is formed on the surface of steel material making the fuel reformer 1A comprising the combustion gas pipe 14, the combustion exhaust gas pipe 13, the combustion exhaust gas outlet 12, the reforming tube outer cylinder 2, the reforming tube inner cylinder 3, the reforming tube inner cylinder upper plate 4 and others at the side where combustion gas flows by coming into contact with the points shown by bold lines, by the heat treatment of raw steel material in an oxidizing atmosphere of 600 to 1000° C. for 30 min to 10 hours.

The side where combustion gas flows by coming into contact with the points shown by the bold line including the heating portion 8 of the fuel reformer 1A is in a hot and low oxygen concentration atmosphere easy to provoke the water vapor oxidation. However, as the Cr oxide layer is formed preliminarily on these surfaces of the combustion gas passage side, the water vapor oxidation on the surface is prevented and the generation of red scale is prevented, improving the heat resistance. Thereby, the life and reliability of the reformer are improved.

Figure 2:
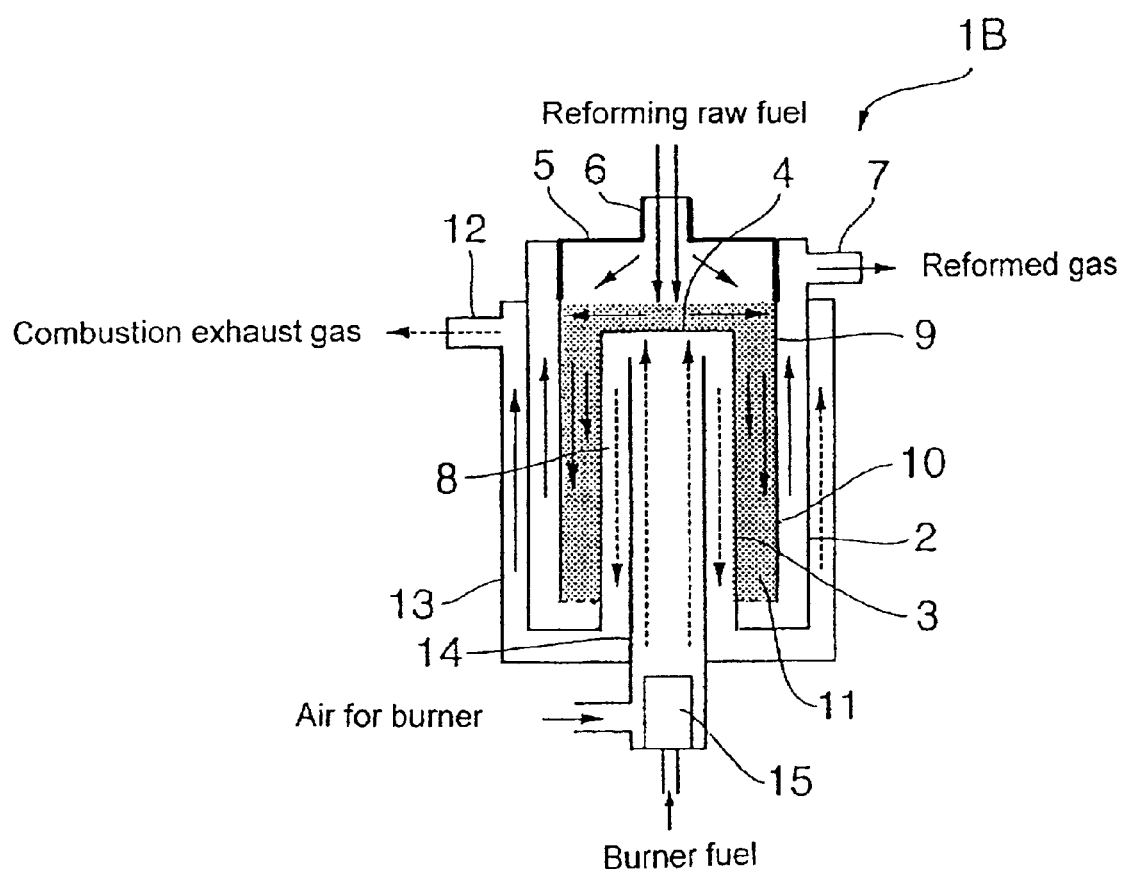
FIG. 2 a cross-portional illustrative drawing of another embodiment of the fuel reformer of the present invention.

FIG. 2 is a cross-portional illustrative drawing of another embodiment of a fuel reformer of the present invention.

In FIG. 2, a fuel reformer 1B of the present invention is similar to the fuel reformer 1A shown in FIG. 1, except that the Cr oxide layer is formed preliminarily on a reforming tube outer cylinder upper plate 5, a raw fuel inlet 6, a part of the upper part of a catalyst tube 10 or others shown by the bold line, in short, on the surface of the passage, where a mixture gas flows and comes into contact therewith, from a fuel supply portion for supplying the mixture gas of raw fuel for reforming and water vapor to a filled portion of the reforming catalyst 11.

The mixture gas passage from the fuel supply portion for supplying the fuel reformer 1B with the mixture gas to a filled portion of the reforming catalyst 11 is in a hot and high water vapor concentration atmosphere easy to provoke the water vapor oxidation. However, since the Cr oxide layer is formed on the surface of the mixture gas passage, the water vapor oxidation on the surface and the generation of red scale are prevented, improving the heat resistance. Thereby, the life and reliability of the reformer are improved.

Figure 3:
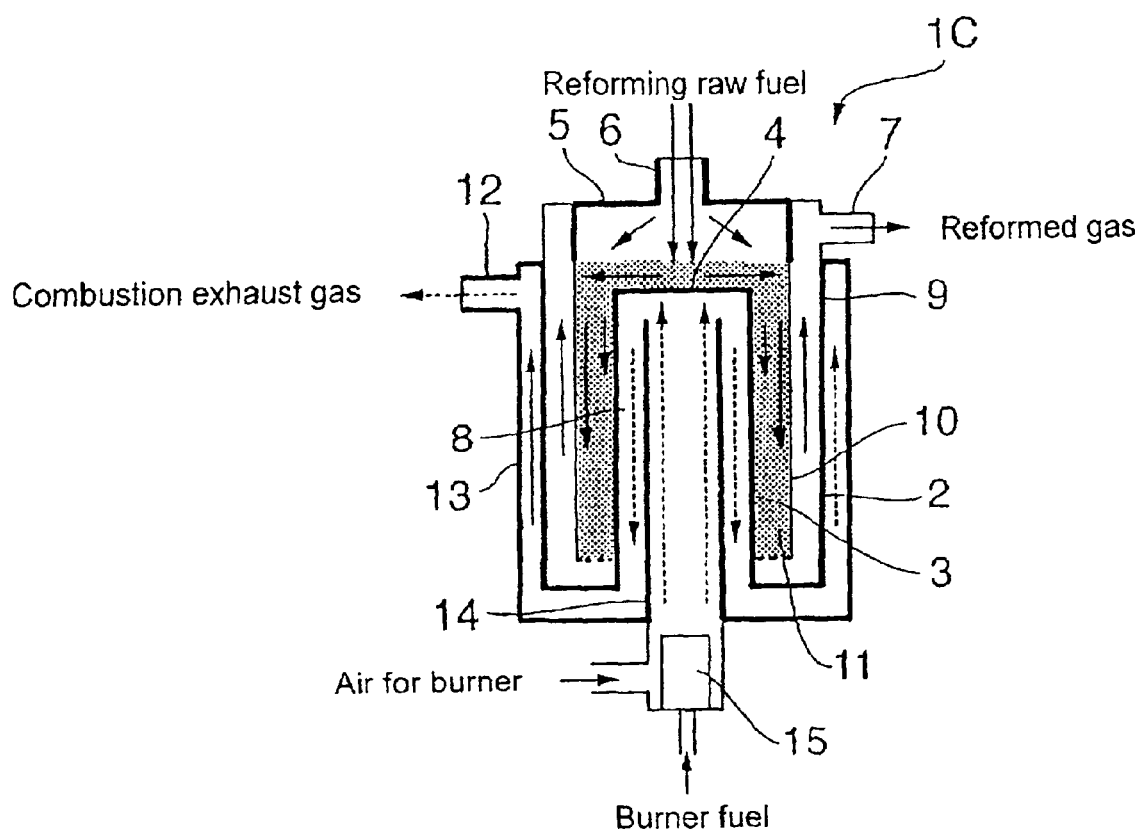
FIG. 3 is a cross-portional illustrative drawing of another embodiment of the fuel reformer of the present invention.

FIG. 3 is a cross-portional illustrative drawing of another embodiment of the fuel reformer of the present invention.

In FIG. 3, a fuel reformer 1C of the present invention is similar to the fuel reformers 1A, 1B shown in FIG. 1 or FIG. 2, except that a Cr oxide layer is formed on the surface of steel material making the fuel reformer 1C comprising a combustion gas pipe 14, a combustion exhaust gas pipe 13, a combustion exhaust gas outlet 12, a reforming tube outer cylinder 2, a reforming tube inner cylinder 3, reforming tube inner cylinder upper plate 4 and the others at the side where combustion gas flows coming into contact with the points shown by bold lines and also the Cr oxide layer is formed on the reforming tube outer cylinder upper plate 5, the raw fuel inlet 6, a part of the upper part of the catalyst tube 10 or the others shown by the bold line, in short, on the surface of the mixture gas passage from the fuel supply portion for supplying the mixture gas of raw fuel for reforming and water vapor to the filled portion of the reforming catalyst 11.

Since the combustion gas passage side including the heating portion 8 of the fuel reformer 1C is in a hot and low oxygen concentration atmosphere easy to provoke the water vapor oxidation, and the mixture gas passage from the fuel supply portion for supplying the fuel reformer 1C with mixture gas to a filled portion of the reforming catalyst 11 is in a hot and high water vapor concentration atmosphere easy to provoke the water vapor oxidation, the formation of the Cr oxide layer on the surface of the combustion gas passage side and the surface of the mixture gas passage prevents the water vapor oxidation on both surfaces and prevents the generation of red scale, improving the heat resistance. Thereby, the life and reliability of the reformer are improved.

The description of the aforementioned embodiments is only for the purpose of explanation of the present invention and does not limit the invention described in claims, nor reduce the scope. Moreover, the composition of respective parts of the present invention is not limited to the aforementioned embodiments, but various variants can be made without departing from the technical scope described in claims.

In short, the fuel reformer of the present invention is not limited to the fuel reformers of the type described in FIG. 1 to FIG. 3, but it may also be, for example, a multi-tube type fuel reformer, a flat plate type fuel reformer or the like, and as other examples, more particularly, fuel reformers described in FIG. 1 and FIG. 3 of Japanese Patent Publication No. 2703831, fuel reformers described in FIG. 2 to FIG. 8 of Japan Patent Application Laid-Open Hei 6-13096, fuel reformers described in FIG. 1 to FIG. 3 of Japan Patent Application Laid-Open Hei 6-56401, fuel reformers described in FIG. 1, FIG. 4 and FIG. 7 of Japan Patent Application Laid-Open Hei 7-109105, fuel reformers described in FIG. 1 and FIG. 3 of Japan Patent Application Laid-Open Hei 7-223801, a fuel reformer described in FIG. 1 of Japan Patent Application Laid-Open Hei 7-335238, fuel reformers described in FIG. 1 and FIG. 3 of Japan Patent Application Laid-Open Hei 9-241002, fuel reformers described in FIG. 1 of Japan Patent Application Laid-Open Hei 9-306553, fuel reformers described in FIG. 1 to FIG. 4 of Japan Patent Application Laid-Open Hei 10-125342 and others can be cited.

Since the fuel reformer of claim 1 of the present invention does not increase the thickness of the reformer of the prior art, and a Cr oxide layer is formed preliminarily at least on a part of the surface of steel material making the reformer, it has a remarkable effect of providing a heat resistive, light, low cost and cheap, highly reliable and long life fuel reformer, that produces no red scale through water vapor oxidation of the surface of steel material making the reformer, even when exposed to an atmosphere of low oxygen concentration and/or high water vapor concentration under a high temperature.

In the fuel reformer of claim 2 of the present invention, as the Cr oxide layer is formed preliminarily on the surface of the combustion passage side of steel material, where water vapor oxidation is produced easily under a high temperature and a low oxygen concentration, thereby it has remarkable effects of preventing water vapor on the surface, preventing production of red scale, improving the heat resistance, and being light, low cost and cheap, highly reliable and long life.

For the fuel reformer of claim 3 of the present invention, as the Cr oxide layer is formed preliminarily on the surface of the mixture gas passage from the fuel supply portion for supplying the mixture gas to the filled portion of the reforming catalyst, where water vapor oxidation is produced easily under a high temperature and a high water vapor concentration, it has remarkable effects of preventing water vapor oxidation on the surface, preventing production of red scale, improving the heat resistance, and being light, low cost and cheap, highly reliable and long life.

For the fuel reformer of claim 4 of the present invention, the Cr oxide layer is formed preliminarily on any of the surface of the combustion passage side where water vapor oxidation is produced easily under a high temperature and a low oxygen concentration, and the surface of the mixture gas passage from the fuel supply portion for supplying mixture gas to the filled portion of the reforming catalyst in an atmosphere where water vapor oxidation is produced easily under a high temperature and a high water vapor concentration, thereby it has remarkable effects of preventing water vapor oxidation on the surface, preventing production of red scale, improving the heat resistance, and being light, low cost and cheap, highly reliable and long life.

For the fuel reformer of claim 5 of the present invention, since the average thickness of the Cr oxide layer is 5 to 100 μm, the Cr oxide layer has remarkable effects of having a good adhesion to the surface of the substrate steel material and an excellent resistance to the water vapor oxidation.

According to the fuel reformer of claim 6 of the present invention, since a thin film having a Cr concentration higher than a Cr concentration of a base material is formed preliminarily on the surface of steel material making the reformer by a method such as chromizing or chrome plating, and thereafter a Cr oxide layer is formed by heat treatment, the heat treatment temperature can be reduced, energy quantity can be lowered allowing to reduce energy consumption, and moreover, the Cr oxide layer formed by heat treatment becomes dense. Furthermore, since a thin film having a Cr concentration higher than a Cr concentration of a base material is formed preliminarily on the surface of steel material making the reformer, it has a remarkable effect capable of forming a dense Cr oxide layer in a short period of time on the surface thereof, even when the base material Cr concentration is low.

The manufacturing method of claim 7 has a remarkable effect capable of forming easily the Cr oxide layer on the surface of raw steel material before manufacturing the fuel reformer of the present invention, to form the Cr oxide layer on the surface of raw steel material and then to manufacture easily the fuel reformer of the present invention by assembling or welding, using the same.

The manufacturing method of claim 8 of the present invention has a remarkable effect capable of manufacturing the fuel reformer of the present invention, by forming the Cr oxide layer on the surface of raw steel material, through the treatment of a fuel reformer made of raw steel material where the Cr oxide layer is not formed yet.

For the manufacturing method of claim 9 of the present invention, since a thin film having a Cr concentration higher than a Cr concentration of a base material is formed on the surface of raw steel material, and thereafter a Cr oxide layer is formed by a heat treatment in an oxidizing atmosphere of 350 to 650° C., and then the fuel reformer is manufactured using the raw steel material where the Cr oxide layer is formed, it becomes less troublesome, energy quantity can be lowered allowing to reduce energy consumption, thereby the Cr oxide layer formed by heat treatment becomes dense. Moreover, since a thin film having a Cr concentration higher than a Cr concentration of a base material is formed preliminarily on the surface of steel material making the reformer, a dense Cr oxide layer can be formed in a short period of time on the surface thereof, even when the base material Cr concentration is low.

According to the manufacturing method of claim 10 of the present invention, a thin film having a Cr concentration higher than a Cr concentration of a base material is formed on the surface of raw steel material thereof, and thereafter a Cr oxide layer is formed on raw steel material, through a heat treatment of a fuel reformer made of raw steel material in an oxidizing atmosphere of 350 to 650° C., so it becomes less troublesome, energy quantity can be lowered allowing to reduce energy consumption, and also the Cr oxide layer formed by heat treatment becomes dense. In addition, the thin film having a Cr concentration higher than a Cr concentration of a base material is formed preliminarily on the surface of steel material making the reformer, so it has a remarkable effect capable of forming a dense Cr oxide layer in a short period of time on the surface thereof, even when the base material Cr concentration is low.

INDUSTRIAL APPLICABILITY

The present invention concerns a fuel reformer for reforming a hydrocarbon base fuel into a hydrogen rich gas and a manufacturing method thereof and the fuel reformer of the present invention produces no red scale through water vapor oxidation of the surface of steel material making the reformer, even when exposed to an atmosphere of low oxygen concentration and/or high water vapor concentration under a high temperature. The fuel reformer of the present invention has an extremely important industrial utility value because it is highly heat resistant, light, low cost and cheap, highly reliable and long life, and moreover a cheap, highly reliable and long life fuel reformer can be manufactured at a low cost and easily by the manufacturing method of the present invention.

What is claimed is:

1. A fuel reformer vessel for reforming a hydrocarbon base fuel and water into a hydrogen rich gas comprising a reformer catalyst filled portion, wherein a Cr oxide layer is formed on at least a part of a surface of a steel material, wherein said fuel reformer vessel is formed of a material comprising the steel material, and said surface of the steel material is under an oxidative atmosphere by water vapor.

2. The fuel reformer vessel of claim 1, wherein said Cr oxide layer is formed on a surface of a fuel combustion gas passage side thereof.

3. The fuel reformer vessel of claim 1, wherein said Cr oxide layer is formed on a surface of a mixture gas passage from a fuel supply portion for supplying the fuel reformer vessel with mixture gas of raw fuel and water for reforming to the reforming catalyst filled portion thereof.

4. The fuel reformer vessel of claim 1, wherein said Cr oxide layer is formed on a surface of a fuel combustion gas passage side thereof and on the surface of the mixture gas passage from a fuel supply portion for supplying the fuel reformer vessel with mixture gas of raw fuel and water vapor for reforming to the reforming catalyst filled portion thereof.

5. The fuel reformer vessel of claim 1, wherein an average thickness of said Cr oxide layer is 5 to 100 $\mu$m.

6. The fuel reformer vessel of claim 1, wherein said Cr oxide layer is formed on said surface of the steel material by heat treating the fuel reformer vessel under an oxidizing atmosphere thereby to convert Cr to Cr oxide after forming thereon a thin film containing Cr in a higher concentration than that of a base material thereof.

7. A method of manufacturing a fuel reformer vessel for reforming a hydrocarbon base fuel and water into a hydrogen rich gas, the fuel reformer vessel comprising a reformer catalyst filled portion, said method comprising the steps of:

forming a Cr oxide layer on at least a part of a surface of raw steel material by heat treating said raw steel material under an oxidizing atmosphere of 600 to 1000° C., said surface of the steel material is under an oxidative atmosphere by water vapor;

manufacturing a vessel for the fuel reformer vessel by using said raw steel material on which the Cr oxide layer is thus formed; and filling thus manufactured vessel with a reforming catalyst thereby to produce the fuel reformer vessel.

8. A method of manufacturing a fuel reformer vessel for reforming a hydrocarbon base fuel and water into a hydrogen rich gas, the fuel reformer vessel comprising a reformer catalyst filled portion, said method comprising the steps of:

manufacturing a vessel for the fuel reformer vessel by using raw steel material;

forming a Cr oxide layer on at least a part of a surface of the raw steel material by heat treating in an oxidizing atmosphere of 600 to 10000° C., said surface of the steel material is under an oxidative atmosphere by water vapor; and filling said vessel with a reforming catalyst thereby to produce the fuel reformer vessel.

9. A method of manufacturing a fuel reformer vessel for reforming a hydrocarbon base fuel and water into a hydrogen rich gas, the fuel reformer vessel comprising a reformer catalyst filled portion, said method comprising the steps of:

forming a Cr oxide layer on at least a part of a surface of a steel material for making a fuel reformer vessel by heat treatment of 350 to 650° C. under an oxidizing atmosphere to convert Cr to Cr oxide after forming thereon a thin film containing Cr in a higher concentration than that of a base material thereof, said surface of the steel material in the fuel reformer vessel is under an oxidative atmosphere by water vapor;

manufacturing the vessel for the fuel reformer vessel using said raw steel material on which said Cr oxide layer is thus formed thereon; and filling thus manufactured vessel with a reforming catalyst thereby to produce the fuel reformer vessel.

10. A method of manufacturing a fuel reformer vessel for forming a hydrocarbon base fuel and water into a hydrogen rich gas, the fuel reformer vessel comprising a reformer catalyst filled portion, said method comprising the steps of:

forming a thin film containing Cr in a higher concentration than that of a base material thereof on at least a part of a surface of raw steel material, said surface of the steel material is under an oxidative atmosphere by water vapor;

thereafter forming a Cr oxide layer on the surface of said raw steel material by heat treating said raw steel material under an oxidizing atmosphere of 350 to 650° C. to convert Cr to Cr oxide;

manufacturing the fuel reformer vessel by using said raw steel material on which said Cr oxide layer is thus formed; and filling thus manufactured vessel with a reforming catalyst thereby to produce the fuel reformer vessel.

11. The method of manufacturing a fuel reformer vessel of any one of claims 7 to 10, wherein an average thickness of said Cr oxide layer is 5 to 100 $\mu$m.

* * * * *